United States Patent [19]

Koning

[11] 4,437,399
[45] Mar. 20, 1984

[54] TWINE-WRAPPING MECHANISM FOR MECHANISM FOR A LARGE ROUND BALER

[75] Inventor: Richard W. Koning, Ottumwa, Iowa

[73] Assignee: Deere & Company, Moline, Ill.

[21] Appl. No.: 382,890

[22] Filed: May 28, 1982

[51] Int. Cl.³ .............................................. B30B 13/18
[52] U.S. Cl. .......................................... 100/4; 100/5; 100/88; 56/341
[58] Field of Search .......................... 100/5, 13, 88, 4; 56/341

[56] References Cited

U.S. PATENT DOCUMENTS

| | | | |
|---|---|---|---|
| 2,468,641 | 4/1949 | Scranton | 100/5 |
| 3,894,484 | 7/1975 | Anstey | 100/5 |
| 3,913,473 | 10/1975 | Meiers | 100/5 |
| 4,057,954 | 11/1977 | Mast | 100/5 X |
| 4,062,279 | 12/1977 | Grube et al. | 100/5 |
| 4,182,235 | 1/1980 | Harig | 100/5 X |
| 4,253,387 | 3/1981 | Schmitt | 100/5 |

*Primary Examiner*—Billy J. Wilhite

[57] ABSTRACT

An automatic twine-wrapping mechanism for a large round baler. The mechanism comprisers (1) a twine dispensing mechanism for dispensing twine into the bale-forming chamber of the baler, (2) a reversible hydraulic drive means for cycling a twine arm of the dispensing mechanism back and forth in front of the chamber, (3) a twine wrapping control mechanism (a) for initiating a twine wrapping cycle by sensing the growth of a bale to a predetermined diameter by automatically actuating a pump drive means for driving a hydraulic pump and by positioning a hydraulic control valve to condition the hydraulic drive means to cycle the twine arm and (b) for terminating a twine wrapping cycle by deactivating the hydraulic drive means following the wrapping of twine around the bale. The twine is automatically severed by a twine cutter responsive to the movement of the twine arm following completion of the wrapping of the twine around the bale. The baler operator actuates a bale ejection mechanism following the cutting of the twine. Following bale ejection, the twine wrapping cycle is terminated by the twine wrapping control mechanism sensing that the bale chamber is empty. The baler is now ready to begin the formation of another bale therein.

7 Claims, 7 Drawing Figures

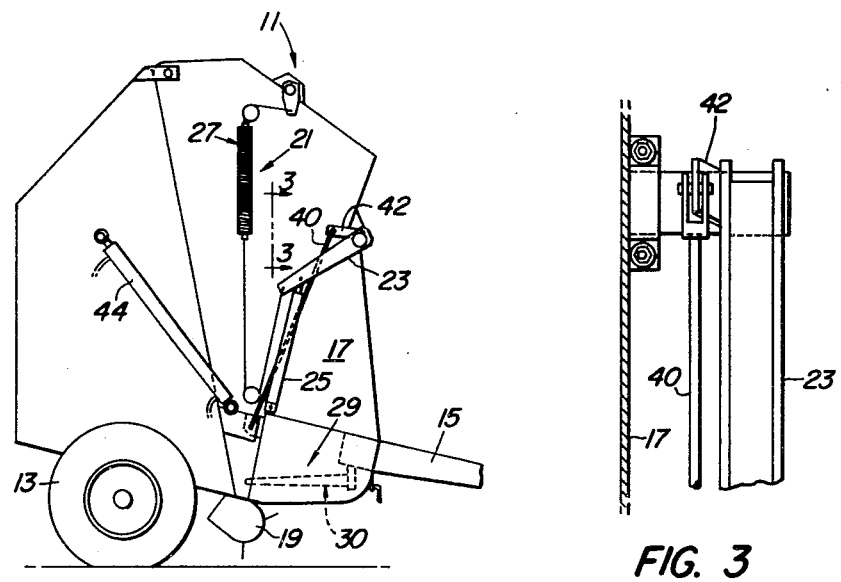
FIG. 1
FIG. 3
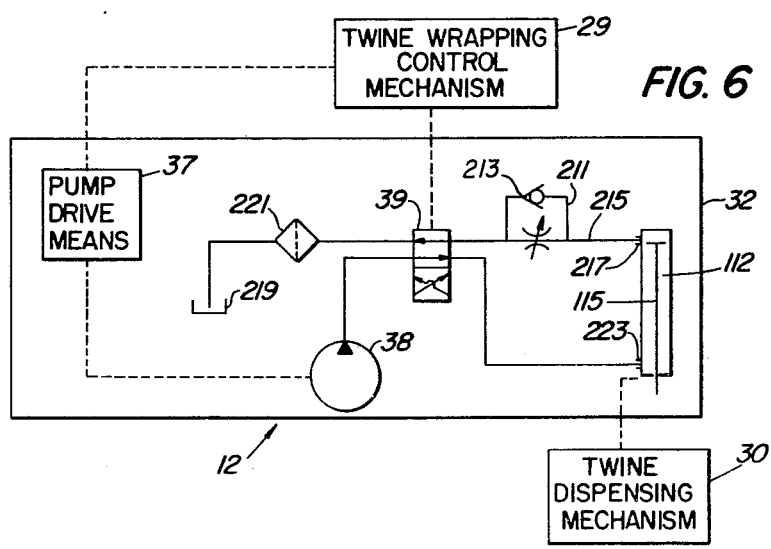
FIG. 6

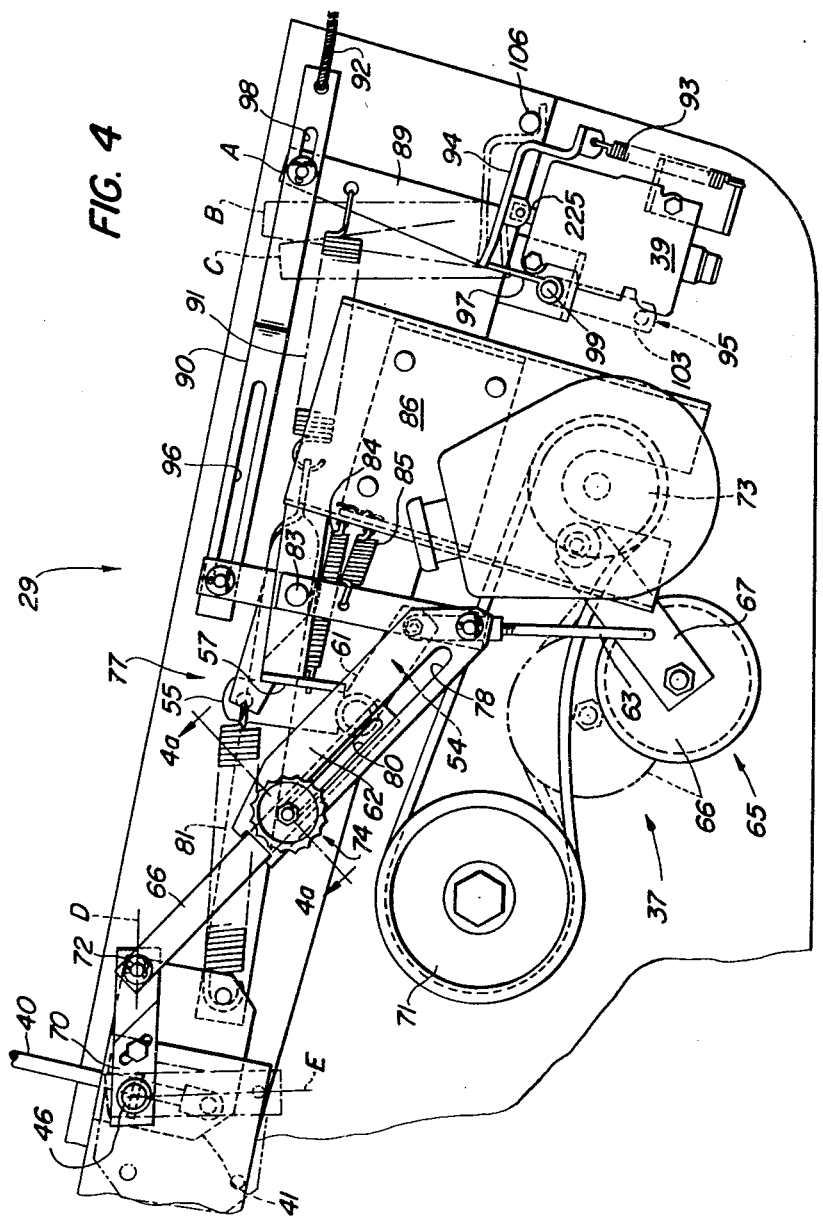

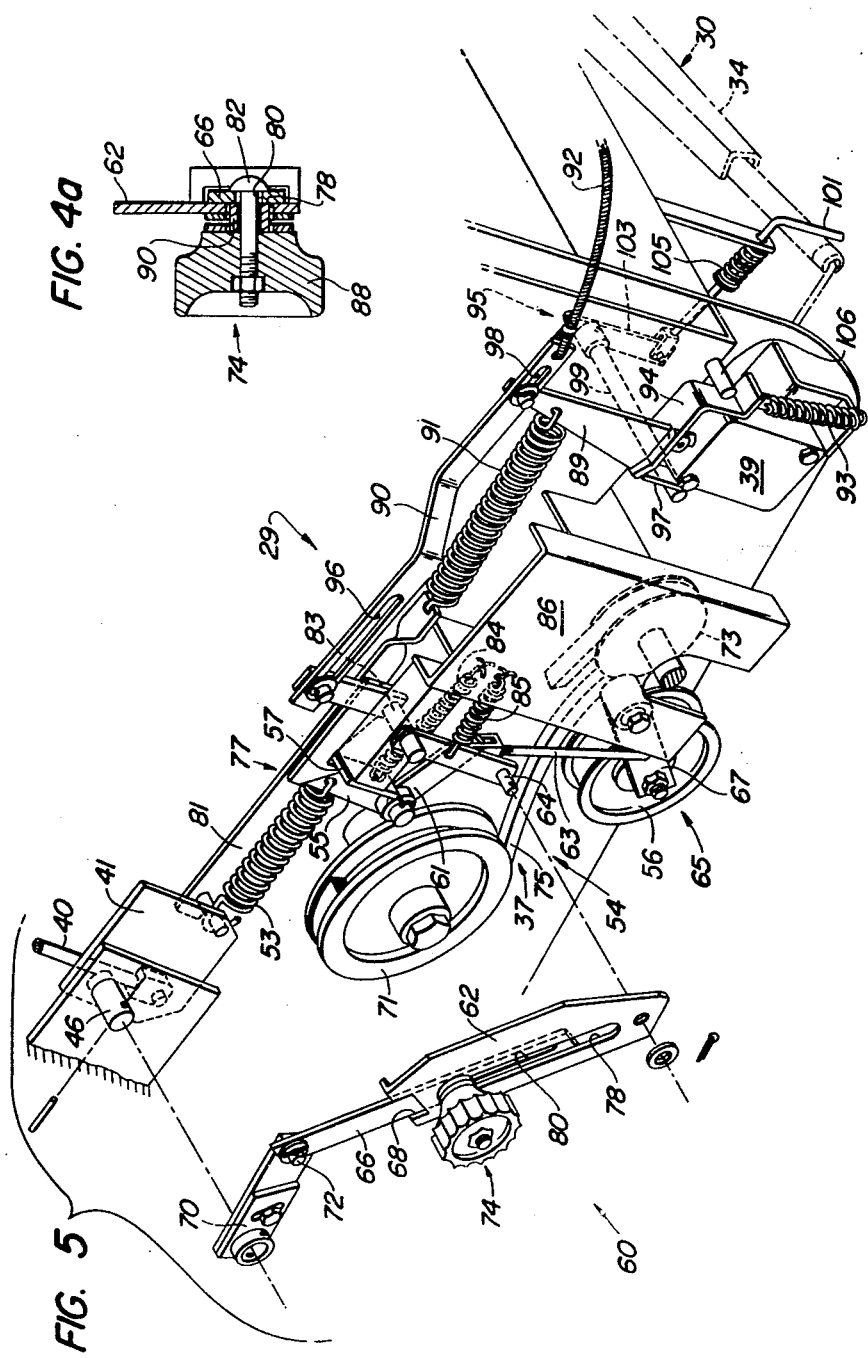

TWINE-WRAPPING MECHANISM FOR MECHANISM FOR A LARGE ROUND BALER

CROSS REFERENCE TO RELATED APPLICATIONS

U.S. application Ser. No. 285,178 entitled STAGGERED ROLLS AND BELTS FOR ROUND BALER and filed on July 20, 1981 in the name of Jean Viaud is now U.S. Pat. No. 4,399,746 directed to a round baler having a bale forming chamber defined by a plurality of belts trained about a plurality of rolls. The path of some of the belts around the rolls is varied so as to form openings through which crop material in regions adjacent the bale forming chamber may escape.

U.S. application Ser. No. 308,223, entitled BELT TENSIONING SYSTEM FOR ROUND BALERS and filed on Oct. 5, 1981 in the name of Koning et al. now U.S. Pat. No. 4,391,187 is directed to a round baler with a bale forming chamber defined by a plurality of belts trained about a plurality of rolls. A pair of the rolls is journalled on a carrier arm and is movable on the arm during bale formation to control the size of the bale chamber and the density of the bale being formed in the chamber.

U.S. application Ser. No. 303,274, entitled TWINE-WRAPPING MECHANISM FOR A LARGE ROUND BALER and filed on Sept. 17, 1981 in the name of Meiers is directed to a cylindrical baler with an automatic mechanism for wrapping twine around bales formed in the chamber at the end of the bale formation cycle.

BACKGROUND OF THE INVENTION

This invention is directed to a baler (commonly known as "round baler") for forming cylindrical bales and having a bale forming chamber defined by a plurality of belts trained about a plurality of rolls and more particularly, to an automatic mechanism with a manual override for wrapping twine around bales formed in the chamber.

Semiautomatic twine wrapping mechanisms for round balers for agricultural crops are well known. One commercially available wrapping mechanism is similar to that disclosed in U.S. Pat. Nos. 3,894,484 and 3,913,473. The mechanism comprises generally a hydraulically driven twine arm which is movable back and forth in front of an entrance to the bale forming chamber. Initiation and termination of the twine wrapping cycle is manually controlled. The rate of advance of the arm transversely of the bale forming chamber is subject to manual control by the adjustment of the flow control valve in the hydraulic circuit. Following extended commercial use, certain disadvantages for this mechanism have been noted. First, it is desirable to provide automatic (rather than semiautomatic) initiation and termination of the twine wrapping cycle. Heretofore, the operator monitored a bale size gauge on the front of the baler from the operator's position on the tractor pulling the baler. When the bale reached the desired size, the operator then continued baling and pulled a hydraulic lever to actuate movement of the twine arm from a first side of the baler to the second. When the twine is fed with the crop material into the bale forming chamber, the tractor is stopped to discontinue feeding crop into the chamber. The lever is retained in is shifted position until the twine arm reached the second side and held there to allow one or more turns of twine to go around the end of the bale. Then, the hydraulic lever is shifted back to the first side of the baler. The rate of movement of the twine arm from the second to the first side of the baler and therefore the number of wraps of twine around the bale is controlable by adjustment of the flow control valve in the hydraulic circuit. The rate of flow is adjusted such that at least one full wrap of twine is formed around the end of the bale. The twine is then automatically cut. With the automation of such procedure, the burden on the operator of monitoring the operation of the machine behind him from his position in front of the tractor would, of course, be relieved.

It is also known to provide a fully automated twine wrapping mechanism using a mechanical drive from the PTO to drive a pair of twine arms transversely of the bale forming chamber. See, for example, U.S. Pat. No. 4,167,844.

Further, it is known to provide a fully automated twine wrapping system using a spring drive for moving a single twine arm from a first side to the second side of the baler and a hydraulic drive for moving the twine arm from the second side back to the first side. See U.S. Pat. No. 4,150,614.

In accordance with U.S. application, Ser. No. 303,274, cross referenced above, a fully automated hydraulically driven twine wrapping mechanism is disclosed. The wrapping mechanism includes a twine wrapping control mechanism which automatically controlled the actuation of the hydraulic pump and the control valve of the hydraulic drive means for the twine dispensing mechanism. The control mechanism further includes an adjustable length bale diameter sensing link which could be preset to determine the diameter at which the wrapping mechanism would be actuated.

Actuation is accomplished by stretching a pair of springs to energize the hydraulic drive means when the springs are fully stretched. The full stretch of the springs causes the release of a latch to relieve the tension on one of the springs to actuate the drive for the hydraulic pump. However, the sensing links had a limited range of adjustability. In addition, no means were provided for manually overriding the twine wrapping control mechanism and thus, the flexibility of an operator to actute the wrapping mechanism at his option such as may be desirable, for example, on the completion of baling in a field was limited to the setting of the sensing link.

It is known to provide a round baler with a twine wrapping mechanism which is adapted to the actuated either manually or automatically by a power motor such as a hydraulic cylinder. See U.S. Pat. No. 4,072,095.

Accordingly, it is an object of this invention to provide an improved fully automated hydraulically driven twine wrapping mechanism with a twine wrapping control mechanism with a manual override and to wrap a bale at a selected diameter irrespective of the diameter preset for actuation of the twine wrapping mechanism.

Another object of the invention is to provide a twine wrapping mechanism with a single manual override control linkage for cycling the twine dispensing mechanism through a second cycle and for actuating the wrapping mechanism to wrap a bale at a selected diameter irrespective of the diameter preset for actuation of the twine wrapping mechanism.

Still another object is to provide a twine wrapping control mechanism which controls actuation of a latch for the pump drive independently of tension springs for shifting a hydraulic drive means and a hydraulic valve control arm.

SUMMARY OF THE INVENTION

These and other objects of the invention are accomplished by automatic twine wrapping mechanism for a cylindrical baler comprising a twine dispensing mechanism for dispensing twine into the bale forming chamber for wrapping around a bale being formed therein. The dispensing mechanism includes a twine arm movable back and forth in front of the bale forming chamber between first and second positions. The twine arm is driven back and forth in front of the bale forming chamber by a hydraulic drive means. The drive means includes (1) a cylinder, (2) a hydraulic pump connected to the cylinder, (3) a pump drive for selectively driving the pump, and (4) a control valve interconnected between the cylinder and the pump. The valve conditions the hydraulic drive means such that the twine arm is driven from the first position to the second position and from the second position back to the first position respectively. A control means initiates a twine wrapping cycle by automatically actuating the pump drive means and positioning a valve control arm in a first valve control arm position for moving the twine arm from its first to its second position responsive to the formation of a completed bale in the chamber and terminates a twine wrapping cycle by deactivating the hydraulic drive means following completion of the wrapping of twine around the bale.

The control means includes (1) a drive control linkage for engaging and disengaging the pump drive, (2) means for biasing the drive control linkage into an engaged position, (3) a latch for locking a drive control linkage in a disengaged position and (4) a bale size linkage movable responsive to a change in the diameter of a bale being formed in the bale forming chamber.

In accordance with the improvement of this invention, the control means further includes a latch control linkage connected between the bale size linkage and the latch. The latch control linkage has a plurality of settings for determining the bale diameter at which the latch is unlocked. The control means further includes a manual control linkage remotely actuatable from an operator's station for the baler for the dual purposes of (1) actuating the wrapping mechanism at a selected diameter different from that preset on the control mechanism or (2) actuating the wrapping mechanism for a second cycle. The manual control linkage is connected between the latch and a valve control arm and is operable for unlocking the latch and positioning the valve control arm in the first valve control arm position.

In accordance with the preferred embodiment, the bale size linkage is a bell crank and the latch control linkage includes a strap and an angle, both having longitudinal slots formed therein. The strap is inserted through an opening in the angle and is adjustably fixed to the angle by a connecting member inserted through the slots of the angle and strap, permitting the maximum combined length of the strap and angle to be adjusted to a plurality of different length or settings corresponding to a plurality of diameters at which a bale is to be automatically wrapped.

BRIEF DESCRIPTION OF THE DRAWINGS

FIG. 1 is a right side, elevational view of a large round baler with an automatic twine-wrapping mechanism in accordance with a preferred embodiment of this invention.

FIG. 3 is a cross-sectional view taken along lines 3—3 of FIG. 1 and showing a portion of the twine wrapping control mechanism.

FIG. 4 is a side elevational view of another portion of the twine wrapping control mechanism for the automatic twine wrapping mechanism of FIG. 1.

FIG. 4A is a cross-sectional view of a portion of the twine wrapping control mechanism taken along line 4A—4A of FIG. 4.

FIG. 5 is a perspective, partially exploded view of the same portion of the twine wrapping control mexhanism shown in FIG. 4. For clarity the hydraulic pump 38 shown in FIG. 4 is omitted in FIG. 5.

FIG. 6 is a general schematic of the twine wrapping mechanism including a detailed schematic circuit diagram of the hydraulic drive means.

DESCRIPTION OF THE PREFERRED EMBODIMENT

I. General

Figure 2:
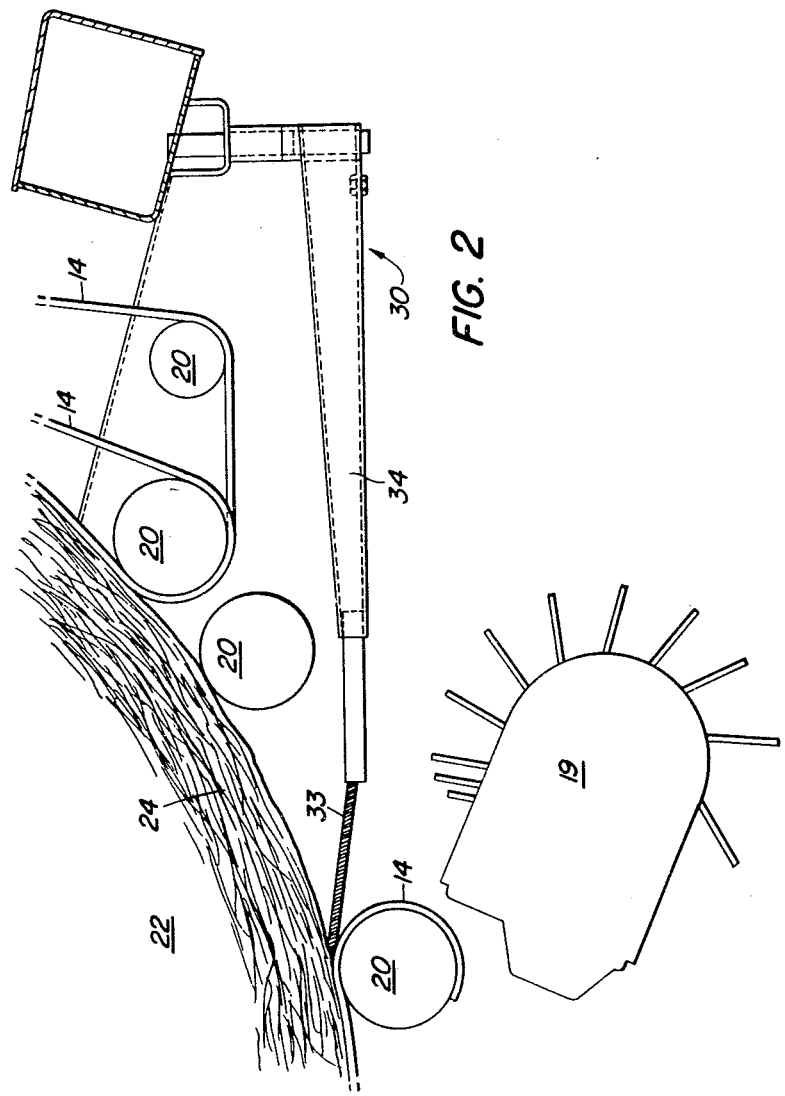
FIG. 2 is a side cross-sectional view of the bale chamber crop inlet of the baler of FIG. 1. The twine arm of the twine dispensing mechanism is shown dispensing twine into the bale chamber.

Reference is now made to FIGS. 1 and 2 which shows a large round baler 11 with an automatic twine wrapping mechanism 12 in accordance with a preferred embodiment of this invention. FIG. 1 is a simplified side elevational view of baler 11 for forming large cylindrical bales of hay or other crop material. FIG. 2 is a framentary cross-sectional, schematic view of the front of baler 11. Baler 11 includes a pair of wheels 13 (only one shown) for mounting baler 11 for pulling via a tractor (not shown) through attachment to tongue 15. The baler is powered through attachment to a conventional rear power take-off mechanism of the tractor. Baler 11 further includes a pair of upright opposite fore-and-aft extending sidewalls, 17, and a plurality of belts 14 supported on a plurality of transverse rolls 20 (some of which are shown in FIG. 2). The roll and belt arrangement shown in FIG. 2 is disclosed and claimed in U.S. application Ser. No. 285,178 cross-referenced above, and the disclosure of which is hereby incorporated by reference. Such arrangement forms no part of the invention herein and is shown and described in part herein only to illustrate the general environment in which the twine wrapping mechanism of this invention is preferably utilized. A crop pickup mechanism 19 of a conventional construction is mounted beneath sidewalls 17, 18 for feeding crop material into bale forming chamber 22. When material issued into the bale forming chamber 22, and as the bale increases in diameter, the size of the bale forming chamber and the density of the bale being formed therein is controlled by a tensioning mechanism 21 as described in more detail and claimed in application Ser. No. 308,223, cross-referenced above, the disclosure of which is hereby incorporated by reference. Tensioning mechanism 21 forms no part of the invention herein and thus is only briefly described herein. Tensioning mechanism 21 includes a pair of control arms 23 (only one being shown) mounted respectively on the exterior of sidewalls 17, 18 to which tension is applied by a pair of hydraulic cylinders 25 (only one shown) and a pair of spring mechanisms 27 (only one shown). As a bale 24 being formed increases in diameter, arm 23 is rotated clockwise in FIG. 1 against the tension imposed thereon by cylinder 25 and spring mechanism 27. When the bale 24 being formed in the chamber is completed (i.e. reaches a predetermined diameter), a twine wrapping cycle is initiated when the twine wrapping mechanism 12 is actuated to apply twine to the circumference of bale 24.

As schematically illustrated generally in FIG. 6, wrapping mechanism 12 includes (1) a twine dispensing mechanism 30 (FIG. 2) for dispensing twine 33 into chamber 22, (2) a hydraulic drive means 32 (FIG. 6) for cycling a twine arm 34 (FIG. 2) of twine dispensing mechanism 30 back and forth in front of chamber 22 and (3) a twine wrapping control mechanism 29 (FIGS. 3-5) for initiating a twine wrapping cycle (a) by sensing the growth of bale 24 to a predetermined diameter (b) by automatically actuating a pump drive means 37 driving a hydraulic pump 38 (shown in FIG. 4 and omitted in FIG. 5 for clarity) and (c) by positioning a two-position hydraulic control valve 39 in a first position and for terminating a twine wrapping cycle by deactivating hydraulic drive means 32 following the wrapping of twine 33 around bale 24. Following completion of the wrapping of a bale in the bale forming chamber 22 by the dispensing of twine 33 from twine-dispensing mechanism 30, twine 33 is severed automatically by a twine cutter not shown herein and preferably as shown in FIGS. 12, 13 of application Ser. No. 303,274 cross-referenced above. Following the cutting of the twine 33, the baler operator actuates a bale ejection mechanism (not shown) which actuates a hydraulic cylinder 44 (FIG. 1) for opening bale forming chamber 22 and permitting the bale to roll out onto the ground. Following bale ejection, baler 11 is then ready to begin the formation of another bale therein.

II. Twine Wrapping Control Mechanism

Referring now primarily to FIGS. 1, 3-5, wrapping control mechanism 29 includes a bale diameter sensing link 40 interconnected between tension control arm 23 and a bale size linkage 41. Link 40 is pivotably mounted to tension control arm 23 via a bracket 42 fixed to arm 23. Bale size linkage is preferably embodied by a bell crank 41 in the preferred form. Link 40 is pivotably mounted to one end of bell crank 41 so that bell crank 41 is movable on a pivot 46 clockwise from position D corresponding to when the bale chamber is empty or has a bale therein less than a predetermined diameter to position E corresponding to when a completed bale is in the chamber 22 and when link 40 is moved to the upper right in FIG. 1 at the initiation of the twine wrapping cycle.

Position E is representative of one of a plurality of position to which bell crank 41 is moved from position D for initiation of a wrapping cycle. The exact location of position is portional to the diameter of the bale at which the wrapping cycle is initiated.

Movement of bell crank 41 to position E shown in FIG. 4 initiates the driving of pump 38 of the hydraulic drive means 32 by actuation of pump drive means 37. Bell crank 41 is connected to one end of an idler tension spring 53. A second end of idler tension spring 53 is connected to a pump drive idler 65 of pump drive 37 via drive control linkage which is preferably embodied by an idler linkage 54 movable between an idler engaged and disengaged positions. Linkage 54 is constituted by (1) an idler bell crank 59, (2) a flange 55 attached to the second end of spring 53 and to a first arm 57 of idler bell crank 59 and (3) a link 63 connecting a second arm 61 of bell crank 59 to pump drive idler 65. Pump drive idler 65 includes an idler pulley 56 which is rotatably mounted on an arm 67 pivotally mounted at 69.

Pump drive 37 further includes a drive pulley 71 interconnected to the "power take-off" shaft (not shown) of the tractor and a driven pulley 73 interconnected with the drive pulley 53 through a belt 75.

The engagement of the pump drive 37 is precisely controlled to be initiated only after the bale 24 has reached a predetermined diameter via an idler latch 77 for locking crank 59 in a first position corresponding to when the bale chamber is empty or when a bale in the chamber has a diameter less than the predetermined value.

In accordance with the improvement of the invention, latch 77 is actuated by a latch control linkage 60 connecting the bale size linkage or bell crank 41 and latch 77. Latch control linkage 60 has a plurality of settings for determining the bale diameter, in excess of a predetermined value, at which latch 77 is unlocked to initiate a bale wrapping cycle. Latch control linkage 60 includes an angle 62 pivoted to latch 77 at a pivot 64, (2) a strap 66 inserted and longitudinally adjustable through an opening 68 in angle 62 responsive to pivotal movement of crank 41 and (3) a lever 70 pinned to pivot 46 at one end and pivotally connected to strap 66 at pivot 72. A connecting means 74 slidably connects angle 62 and strap 66 through slots 78, 80 formed respectively therein and permits the maximum combined length of strap 66 and angle 62 to be adjusted to correspond to the plurality of positions are setting for determining the bale diameter at which latch 77 is unlocked. As shown in FIG. 4A, connecting means 64 includes a bolt 82 inserted through slots 78, 80, a knob 88 into which bolt 82 is fixed and a sleeve 90 which is used to clamp strap 66 between itself 90 and the head of bolt 82. The connecting means 64 is secured firmly to strap 66 by tightening knob 88 to grip strap 66 tightly between sleeve 90 and the head of bolt 82. When strap 66 is so clamped to connecting means 64, angle 62 remains slidable relative to strap 66 within the limits permitted by the position of knob 88 and slot 80. The shorter the fully extended maximum length of strap 66 and angle 62, the smaller the degree of rotation of crank 41 which is needed to unlock latch 77. Conversely, the greater the combined length of strap 66 and angle 62, the greater the degree of rotation of crank 41 is required to unlock latch 77. A small amount of rotation of crank 41 corresponds to a small bale diameter and a larger amount of crank rotation corresponds to a larger bale diameter.

Latch 77 is pivotally mounted at 83 and is biased into its latched position via a return spring 85. When crank 41 is rotated clockwise to position E responsive to formation of a bale in the bale chamber of a predetermined diameter, spring 53 in tensioned and at the same time latch control linkage 60 is moved toward the rear (to the left in FIG. 4) of the baler. With the rearward movement of linkage 60, knob 88 finally engages the end of slot 78, causing latch 77 to pivot about pivot 83 thereby releasing bell crank 59 to be pivoted counterclockwise by the contraction of spring 53. With the shifting of crank 59 counterclockwise, idler 65 is moved to engage and tension belt 75 providing driving engagement between pulleys 71, 73.

At the end of the twine wrapping cycle, an idler return spring 84 connected between a frame member 86 and flange 55 biases idler linkage 54 to its idler disengaged position in the absence of an overriding bias from spring 53. Linkage 54 is then locked in this position by latch 77.

Control mechanism 29 (FIG. 4) is further operative to control the actuation of two-position hydraulic control spool valve 39 by shifting valve control arm 89 between three valve control positions, namely, position A, a rest position in which arm 89 is disposed between twine wrapping cycles, position B for movement of the twine arm 34 from the left side to the right side and position C for movement of the twine arm 34 from the right side back to the left side. When control arm 89 is in position A and C, valve 39 is in the position shown in FIG. 6. When control arm 89 is in position B, valve 39 is in its second position not illustrated in FIG. 6, but formed by connecting the lower envelope of the valve 39 into the hydraulic circuit of FIG. 6. Referring again to FIG. 5, control mechanism 29 further includes a valve control arm spring 91 connected to bell crank 41 via link 81 and to valve control arm 89 and for biasing control arm 89 into positions B and C responsive to the formation of a completed bale in chamber 22. A control arm return spring 93 is attached to control arm 89 for biasing control arm into position A at the end of a wrapping cycle when the bias of spring 91 is relieved. When a bale of a predetermined diameter is formed in the bale forming chamber and crank 41 is rotated clockwise, sufficient tension is imposed by spring 91 on arm 89 to overcome the resistance of spring 93 to move arm 89 from position A to position B. When so positioned, the hydraulic drive means 32 shifts twine arm 34 from the left side to the right side. Control arm 89 is prevented from moving from position B to C by a control arm latch 95. Latch 95 comprises a latch member 99 with a finger 97 at one end engageable with the lower surface of control arm 89 and a latch actuation arm 101 which is interconnected with latch member 99 via a link 103. When control arm 89 is shifted from position A to B a pin 225, pivoted at one end to a lower plate 94 of control arm 89 and connected at the other to the spool of valve 39, is pulled outwardly so that one end of plate 94 engages the top finger 97 and the other engages the bottom of a stop 106. Latch member 97 is rotatably mounted in sidewall 17 and is rotatable counterclockwise against the bias of a spring 105 responsive to the engagement of actuation arm 101 with twine arm 34 at the end of its travel from the left side to the right side of the baler. Upon rotation of latch member 99 counterclockwise, spring 91 shifts control arm 89 into position C which results in the twine arm 34 being driven from the right side to the left side of the baler. In moving from position B to C, plate 94 is shifted counterclockwise and downwardly to shift pin 225 inwardly.

In accordance with another feature of this invention, a manual control linkage 90 is remotely actuable from an operator's station for the baler via rope 92 and is connected between latch 77 for unlocking latch 77 and valve control arm 89 for restoring (if necessary) valve control arm to initially to position A and then to position B. Linkage 90 serves two purposes. First it permits the operator to actuate the wrapping mechanism at his discretion such as for example when completing the baling operation in a field and insufficient crop is available to complete the bale being formed. In this instance, the operator may actuate wrapping mechanism 12 without regard to the setting fixed on latch control linkage 60 assuming the bale in the chamber is of sufficient diameter to tension springs 53, 91 such that pump drive 37 is actuated and valve control arm is biased to position B from position A. Secondly, linkage 90 permits the operator to initiate a second cycle of the wrapping control mechanism 29 to provide additional wraps of twine on a completed bale. Linkage 90 is attached respective to latch 77 and control arm 89 via a pivotably and slidable connection in slots 96, 98 respectively of link 90. Slots 96, 98 permit free movement of latch 77 and control arm 89 to and from their various positions during the automatic operation of wrapping control mechanism 29.

In operation, as crop material is fed into bale forming chamber 22, a bale 24 grows in diameter. The size of chamber 22 is controlled by tension control arms 23 which are pivoted clockwise in FIG. 1. Sensing link 40 is moved upwardly with control arm 23. With movement of sensing link 40, bell crank 41 (FIGS. 4, 5) is pivoted clockwise from position D toward position E which stretches idler tension spring 53 and valve control arm spring 91. Position E is determined by the setting on latch control linkage 60 (i.e. the maximum combined length of strap 66 and angle 62 determined by the setting of connecting means 74 in slot 80 of strap 66 and the engagement of sleeve 90 with the left end of slot 78 of angle 62 (FIG. 4). After reaching position E, latch 77 is released by pivotal movement of latch 77 about pivot 83 responsive to rotation of bell crank 41. Then the tension in spring 53 is applied to idler linkage 54 moving linkage 54 into an idler engaged position against the bias of idler return spring 84. Pump drive 37 is thus activated to activate pump 38 thereby activating hydraulic drive means 32 for twine dispensing mechanism 30.

As valve control spring 91 is tensioned by the movement of bell crank 41 from position D toward position E, sufficient force is applied to the control arm 89 to overcome the force applied to control arm 89 by return spring 93 resulting in the shifting of control arm 89 from position A to position B (FIG. 4). Control arm 89 assumes position B prior to the releasing of latch 77 to engage pump drive 53. In moving from position A to B control arm 89 moves counterclockwise and upwardly relative to pin 225 which is pulled upwardly to set the hydraulic drive means 32 to shift twine arm 34 from the left side adjacent the left sidewall to the right side adjacent sidewall 17. When twine arm 34 reaches the right side and engages actuator arm 101 (FIG. 5) to release latch 95, control arm 89 (FIG. 4) is shifted from position B to C under the bias of spring 91. This movement results in the shifting of pin 225 of valve 39 inwardly to reverse hydraulic drive means 32. When reversed, twine arm 34 is driven from right side to the left side. Upon reaching the end of travel, twine arm 34 engages a cutter mechanism (not shown) which activated to sever twine 33. The baler operator then activates a conventional mechanism (not shown except for cylinder 44) to eject bale 24 from chamber 22. Following ejection, tension control arm 23 is rotated counterclockwise which shifts sensing link 40 downwardly. As sensing link 40 is shifted downwardly, bell crank 41 is permitted to pivot from position E toward position D under the bias of springs 53, 84, 91, 93. Idler return spring 84 restores idler linkage 54 to its idler disengaged position deactivating pump drive 37 and permitting bell crank 59 to be locked into this position by latch 77.

As bell crank 41 is moved from position E to D, the tension on spring 91 is being reduced and reaches a level such that return spring 93 shifts control arm 89 from position C to A. During this movement, the position of valve 39 is unchanged. With the deactivation of pump drive 37 and the restoring of control arm 89 from position C to A, the bale wrapping cycle is thus ended and is conditioned for initiation of a subsequent twine wrapping cycle when the formation of another bale is complete.

Through manual control linkage 90, an operator at his discretion can release latch 77 to activate pump drive 37 (assuming spring 53 is sufficiently tensioned to shift idler linkage 54 into an idler engaged position) and to permit valve control arm 89 to be moved from position C to position A so that a second wrapping cycle may be initiated for the same bale. The geometry of bell crank 41, latch control linkage 60 and springs 53, 91 is chosen such that: (1) substantially all of the tension is applied to springs 53, 91 during growth of a bale diameter from, for example, 0 to 3 feet (0.91 meter) in diameter for a baler capable of forming a bale with a maximum bale diameter of 6 feet (1.82 meters), (2) limited extension of springs 53, 91 takes place during the growth of a bale from 3 to 6 feet in diameter, (3) limited rearward movement of linkage 60 takes place during the bale growth from 0 to 3 feet in diameter, (4) substantial rearward movement of linkage 60 takes place during the growth of a bale from 3 to 6 feet in diameter. With this geometry and for this example, the minimum "predetermined" diameter at which the wrapping mechanism may be automatically or manually actuated is 3 feet. At bales sizes of less than 3 feet, there is insufficient tension on spring 53 to shift idler linkage 54 to its idler engaged position.

III. Hydraulic Drive Means

Reference is now made to FIG. 6, which illustrates a general schematic of twine wrapping mechanism 12 including a detailed schematic circuit diagram of the reversible hydraulic drive means 32 for cycling the twine arm 34 back and forth in front of the bale forming chamber 22. The drive means 32 includes the double acting hydraulic cylinder 112, hydraulic pump 38 connected to cylinder 112 through the four way, two position spool valve 39. An adjustable flow control valve 211 with a bypass 213 is provided in line 215 interconnecting one port of valve 39 with a base port 217 of hydraulic cylinder 112. By the action of flow control valve 211, fluid flow to the left is controlled (i.e. adjustable) and fluid flow to the right flows through bypass 213 and is uncontrolled. Thus fluid flow to extend the piston 115 of the hydraulic cylinder 112 is uncontrolled while fluid flow to retract the piston of the hydraulic cylinder is controlled. A fluid reservoir 219 is also connected to valve 39 through a filter strainer 221.

In operation, FIG. 6 illustrates the condition of the hydraulic drive means between bale wrapping cycles, that is, when the bale chamber is empty or during the formation of a bale in the bale forming chamber. Between bale wrapping cycles, valve control arm 89 is in position A (FIG. 4). In this position, pump 38 is not driven by pump drive 37, thus, no fluid is flowing into a forward port 223 of the cylinder from pump 38. When a completed bale is formed, control means 29 initially shifts valve control arm 89 from position A to B and thereafter activates pump drive means 37 for pump 38. When valve control arm 89 is shifted from position A to position B, the spool of the valve is shifted outwardly of valve 39 completing the fluid path between pump 38 and base port 217 through the bypass 213 of flow control valve 211. Following activation of pump drive 38, the plunger 115 of the cylinder 112 is extended and fluid flow from forward port 223 through valve 39, filter strainer 221 and into reservoir 219. When control arm 89 is shifted from position B to position C, the spool of valve 39 is moved inwardly to complete the fluid path between pump 38 and forward port 223 to cause the plunger 115 of the cylinder 112 to retract. During retraction, fluid from base port 217 flows through adjustable flow control valve 211, which controls the rate of flow therethrough. From valve 211 fluid passes through valve 39, filter strainer 221 and thereafter into reservoir 219. Twine 33 is severed by a twine cutter (not shown) when plunger 115 is fully retracted. The wrapping of the bale is now complete and the bale is ejected by the operator. Following ejection, wrapping control mechanism 29 deactivates pump drive means 37 and shifts valve control arm 89 from position C to A. When control arm 89 is shifted from position C back to A, the position of the spool of valve 87 is unchanged. Hydraulic drive means 32 is thus deactivated until the initiation of another bale wrapping cycle.

The invention herein has been described in connection with a preferred embodiment thereof. It will be appreciated by those skilled in the art that other embodiments and modifications thereof are possible. Accordingly, it is intended that the appended claims cover all such embodiments and modifications as are within the true spirit and scope of the invention.

What is claimed is:

1. In an automatic twine wrapping mechanism for a cylindrical baler having a bale forming chamber, said mechanism comprising:

a twine-dispensing mechanism for dispensing twine into the bale forming chamber of said baler for wrapping around a bale being formed therein, said dispensing mechanism including a twine arm movable back and forth in front of the bale forming chamber between first and second positions, hydraulic drive means for cycling said twine arm back and forth in front of said bale forming chamber, said drive means including a double acting cylinder, a hydraulic pump connected to said cylinder, and pump drive means for selectively driving said pump, and a control valve interconnected between said cylinder and said pump, said valve having a valve control arm movable between a first valve control arm position permitting said twine arm to be driven from the first to said second twine arm position and a second valve control arm position permitting said twine arm to be driven from said second to said first twine arm position, and a control means (1) for initiating a twine wrapping cycle by automatically actuating said pump drive means and by positioning said valve control arm in said first valve control arm position responsive to the formation of bale of a predetermined diameter in said chamber, and (2) for deactivating said hydraulic drive means following wrapping of twine around said bale, said control means including (1) a drive control linkage having an engaged position for engaging said pump drive and a disengaged position for disengaging said pump drive, (2) means for biasing said drive control linkage into said engaged position, (3) a latch for locking said drive control linkage in said disengaged position, and (4) a bale size linkage movable responsive to the change in diameter of a bale in said chamber between a first position corresponding to when the bale chamber is empty or when a bale has a diameter less than a predetermined value and second position corresponding to when a bale in the chamber has a diameter greater than a predetermined value;

the improvement comprising:

said control means including a latch control linkage connecting said bale size linkage and said latch and having a plurality of settings for determining the bale diameter, in excess of said predetermined value, at which said latch is unlocked, and a manual control linkage remotely actuable from operator's station for said baler and connected to said latch for unlocking said latch and for positioning said value control arm in said first value control arm position.

2. The baler of claim 1 wherein; said bale size linkage is a bell crank and said latch control linkage includes a strap having a slot formed therein, an angle having a slot formed therein, and connecting means for connecting said strap and angle together through said slots and permitting the maximum combined length of said strap and angle to be adjusted to correspond to said plurality of positions.

3. The baler of claim 2 wherein:

said angle has an opening, said strap is inserted through said opening and is longitudinally adjustable through said opening responsive to the movement of said bell crank responsive to changes in the diameter of a bale being formed in said chamber.

4. In an automatic twine wrapping mechanism for a cylindrical baler having a bale forming chamber, said mechanism comprising:

a twine-dispensing mechanism for dispensing twine into the bale forming chamber of said baler for wrapping around a bale being formed therein, said dispensing mechanism including a twine arm movable back and forth in front of the bale forming chamber between first and second positions, hydraulic drive means for cycling said twine arm back and forth in front of said bale forming chamber, said drive means including a cylinder, a hydraulic pump connected to said cylinder, and pump drive means for selectively driving said pump, a control means for initiating a twine wrapping cycle by automatically actuating said pump drive means, said control means including a bale size linkage movable responsive to the change in diameter of a bale in said chamber between a first position corresponding to when the bale chamber is empty or when a bale has a diameter less than a predetermined value and second position corresponding to when a bale in the chamber has a diameter greater than a predetermined value;

the improvement comprising:

said control means including a first control linkage interconnected between said bale size linkage and said pump drive means and having a plurality of settings for determining the bale diameter, in excess of said predetermined value, at which said pump drive means is actuated; and a manual control linkage connected to said control means and remotely actuable from an operator's station for said baler for actuating said pump drive means.

5. The wrapping mechanism of claim 4 wherein:

said control means further includes (1) a drive control linkage having an engaged position for engaging said pump drive means and a disengaged position for disengaging said pump drive means and (2) means for biasing said drive control linkage into said engaged position and a latch for locking said drive control linkage in said disengaged position and said manual control linkage is connected to the latch of said control means.

6. The wrapping mechanism of claim 4 wherein:

said bale size linkage is a bell crank and said first control linkage includes (1) a strap having a slot form therein (2) an angle having a slot form therein and (3) connecting means for slidably connecting said strap and angle together through said slots and permitting the maximum combined length of said strap and angle to be adjusted to correspond to said plurality of positions.

7. The wrapping mechanism of claim 6 wherein:

said angle has an opening and said strap is inserted through said opening and is longitudinally adjustable through said opening responsive to the movement of said bell crank responsive to changes in diameter of a bale being formed in said chamber.

* * * * *

UNITED STATES PATENT AND TRADEMARK OFFICE
CERTIFICATE OF CORRECTION

PATENT NO. : 4,437,399
DATED : 20 March 1984
INVENTOR(S) : Richard W. Koning

It is certified that error appears in the above-identified patent and that said Letters Patent is hereby corrected as shown below:

At [54], delete "TWINE-WRAPPING MECHANISM FOR MECHANISM FOR A LARGE ROUND BALER" and insert -- TWINE-WRAPPING MECHANISM FOR A LARGE ROUND BALER --.

Signed and Sealed this

Sixth Day of November 1984

[SEAL]

Attest:

GERALD J. MOSSINGHOFF

Attesting Officer

Commissioner of Patents and Trademarks